E. MAREK.
COUPLING.
APPLICATION FILED JAN. 24, 1914.
1,118,032.
Patented Nov. 24, 1914.
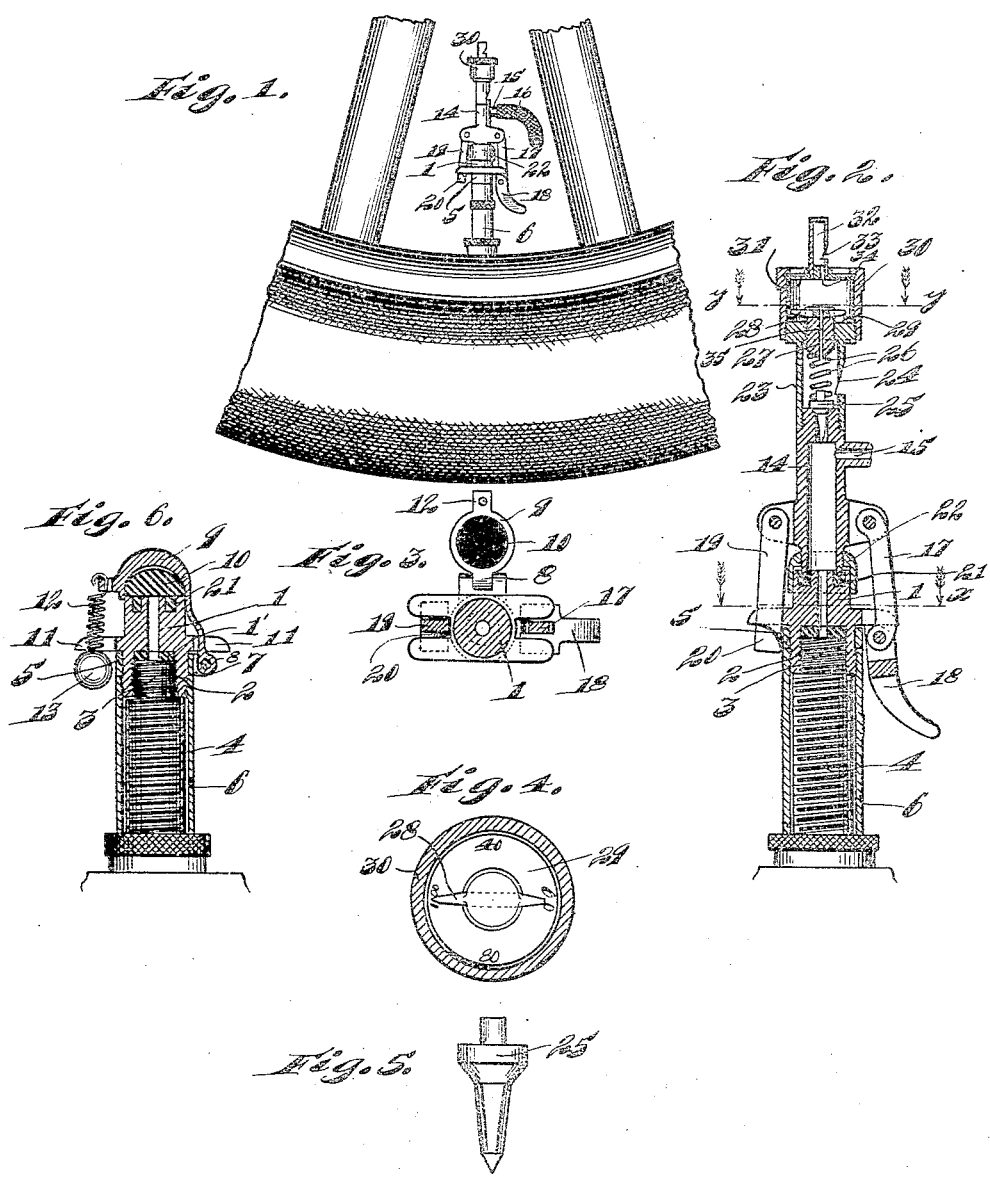

UNITED STATES PATENT OFFICE.

ERNEST MAREK, OF CHICAGO, ILLINOIS, ASSIGNOR OF ONE-HALF TO CHARLES HAINZ, OF CHICAGO, ILLINOIS.

COUPLING.

1,118,032.   Specification of Letters Patent.   Patented Nov. 24, 1914.

Application filed January 24, 1914. Serial No. 814,122.

*To all whom it may concern:*

Be it known that I, ERNEST MAREK, a citizen of the United States, and a resident of the city of Chicago, county of Cook, and State of Illinois, have invented certain new and useful Improvements in Couplings, of which the following is a specification.

My invention relates to improvements in couplings, and more especially to couplings adapted to serve as means for facilitating the inflation of automobile tires, and the like, the present invention being an improvement on the invention set forth in my prior application for couplings, filed November 14, 1913, Serial No. 800,961.

The object of the invention is to provide an improved means for preventing undue inflation of the tire.

The invention consists in the combinations and arrangements of parts hereinafter described and claimed.

The invention will be best understood by reference to the accompanying drawing forming a part of this specification, and in which—

Figure 1 is a side view of a portion of an automobile wheel equipped with a construction embodying my invention, Fig. 2, an enlarged vertical section taken through the valve nipple disclosed in Fig. 1, Fig. 3, a section taken on line x—x of Fig. 2, Fig. 4, an enlarged section taken on line y—y of Fig. 2, Fig. 5, an enlarged detail view of a valve employed in the construction, and Fig. 6, a section corresponding to Fig. 2 but showing a sealing cap employed in the construction in operative position.

The preferred form of construction as illustrated in the drawing comprises a perforated head 1 which is provided with a threaded socket 2 adapted to fit over a threaded projection 3 on the ordinary valve nipple 4 of an ordinary automobile tire, as shown, a suitable sealing washer 1' being arranged in the bottom of socket 2 and adapted to facilitate the formation of an air tight joint. A ring 5 is swiveled on head 1, said ring being held in position thereon by means of a sleeve 6 threaded to the lower end of said head and adapted to embrace valve nipple 4 to protect the same and present an ornamental appearance. At one side, ring 5 is provided with ears 7 between which is pivoted an arm or link 8 carrying at its upper free end a sealing cap 9. Sealing cap 9 is provided with a rubber plug or pad 10 which is adapted to seat upon the upper end of head 1 and seal the same to prevent the escape of air therethrough from nipple 4. Above ring 5, head 1 is provided with laterally extending shoulders or flanges in which are formed diametrically disposed notches 11 which are adapted to permit the passage of link 8 when ring 5 is shifted to bring said link into registration therewith. A helical spring 12 is pivotally connected with the side of cap 9 opposite to link 8, said spring being adapted to pass through the corresponding notch 11, as indicated in Fig. 6. At its lower free end spring 12 carries a stop head 13 which is in the form of a ball. By this arrangement, it will be observed, that ring 5 may be shifted until link 8 comes in registration with one of the notches 11 and then cap 9 may be fitted over the upper end of head 1 and spring 12 passed through the corresponding notch 11 so as to cause stop head 13 to engage under the shoulder of head 1 to yieldingly lock the cap 9 in position to seal head 1 against the escape of air therethrough, and thus prevent leakage of air through valve nipple 4. When it is desired to inflate the tire, cap 9 may be removed from operative position by withdrawing spring 12 from the corresponding notch 11, swinging cap 9 and link 8 outwardly and downwardly through the other notch 11 and then turning ring 5 so as to withdraw link 8 and cap 9 from position in registration with either of the notches 11.

In order to inflate the tire, a hose coupling 14 is provided with a perforated nipple 15 to which is secured a hose 16 leading from the source of compressed air with which it is desired to inflate the tire. Coupling 14 is provided at one end with a swinging link 17 adapted to pass through one of the notches 11 and provided at its free end with an eccentric clamping lever 18 arranged to engage under the shoulder on head 1 and draw coupling 14 to a seat when the other side of said coupling is properly anchored. In order to anchor the other side of coupling 14, a second link 19 is pivotally connected with the other side of said coupling and is provided at its lower end with a cross head 20, said link being adapted to pass through the other notch 11 and said cross head being adapted to engage under the corresponding shoulder on head 1 to constitute such an anchor. An annular rubber packing 21 is arranged in the upper end of head 1 around the opening therethrough so as to constitute a yielding seat for the lower end of hose coupling 14. By this arrangement, when sealing cap 9 is removed from operative position, hose coupling 14 may be readily arranged in operative relation with head 1 and valve nipple 4, and firmly secured in position by passing link 19 through one of the notches 11 and engaging the head 20 under the corresponding shoulder of head 1 and passing the link 17 through the other notch 11 and engaging clamping lever 18 on the other side of said shoulder. Then, by throwing lever 18 downwardly, coupling 14 is drawn to a tight seat on head 1, so as to permit of the inflation of the tire in the usual manner.

In order to further seal and strengthen the connection between coupling 14 and head 1, a cap 22 is secured to the lower end of coupling 14 and is adapted to fit over the upper end of head 1 as shown in Fig. 2. A sleeve 23 is secured to the upper end of coupling 14 and is provided with a whistle opening 24 in one side so that the escape of air through said sleeve will sound the whistle and thus give an audible signal. Sleeve 23 is connected with coupling 14 by a passage which is normally closed by valve 25 held normally in closed position by means of a compression spring 26. At its upper end spring 26 bears against the nose of a threaded plug 27 and by means of which the tension of said spring may be adjusted and consequently the pressure at which valve 25 will open may be varied as desired. Plug 27 is provided with an indicator finger 28 coöperating with a dial 29 to indicate different degrees of pressure. Finger 28 and dial 29 are inclosed by a cap 30 having a transparent celluloid plate 31 at the top thereof so as to permit the inspection of dial 29 and finger 28. By this arrangement it will be observed that spring 26 may be adjusted to cause valve 25 to open at any desired pressure thus preventing injury to the tire by overinflation. The specific arrangement will be found to be a simple and efficient one for the purpose.

Connected with the cap 30 is a supplementary whistle 32 of smaller capacity than whistle 23—24 and provided with a whistle opening 33. Whistle 32 is connected with cap 30 through a minute opening 34 and a minute opening 35 is formed in plug 27 so as to permit the passage of air to cap 30 when valve 25 opens. The arrangement is such that when there is too great an escape of air to operate whistle 23—24, a portion of said air will pass into cap 30 and whistle 32 and operate the same.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a pneumatic tire and a valve nipple for inflating the same, of a hose coupling seating upon said nipple; a spring held safety valve in said coupling; a large whistle arranged to be operated by escape of air through said valve; a small supplemental whistle having a minute connection with said large whistle; and means for clamping said coupling to said nipple, substantially as described.

2. The combination with a pneumatic tire and a valve nipple for inflating the same, of a hose coupling seating upon said nipple; an adjustable spring held safety valve in said coupling; a large whistle arranged to be operated by escape of air through said valve; a supplemental whistle having a minute connection with said large whistle; and means for clamping said coupling to said nipple, substantially as described.

3. The combination with a pneumatic tire and a valve nipple for inflating the same, of a hose coupling seating upon said nipple; a safety valve in said coupling; a perforated threaded plug arranged opposite said valve; a spring seated on said plug and said valve; a large whistle arranged to be operated by escape of air through said valve; a small supplemental whistle arranged to be operated by air passing through said perforated plug; and means for clamping said coupling to said nipple, substantially as described.

In testimony whereof I have signed my name to this specification in the presence of two subscribing witnesses.

ERNEST MAREK.

Witnesses:
 JOSHUA R. H. POTTS,
 HELEN F. LILLIS.